United States Patent
Huang et al.

(10) Patent No.: US 12,524,898 B2
(45) Date of Patent: Jan. 13, 2026

(54) SYSTEM AND METHOD FOR ESTIMATING A LENGTH OF UNDERWATER CREATURES

(71) Applicant: NATIONAL SUN YAT-SEN UNIVERSITY, Kaohsiung (TW)

(72) Inventors: Ing-Jer Huang, Kaohsiung (TW); Yun-Nan Chang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 413 days.

(21) Appl. No.: 18/190,995

(22) Filed: Mar. 28, 2023

(65) Prior Publication Data

US 2024/0029289 A1 Jan. 25, 2024

(30) Foreign Application Priority Data

Jul. 22, 2022 (TW) .................................. 111127457

(51) Int. Cl.
*G06T 7/60* (2017.01)
*G01B 11/03* (2006.01)
(Continued)

(52) U.S. Cl.
CPC ................ *G06T 7/60* (2013.01); *G01B 11/03* (2013.01); *G06T 7/50* (2017.01); *G06V 20/05* (2022.01);
(Continued)

(58) Field of Classification Search
CPC ... G06T 7/60; G06T 7/50; G06T 2207/10016; G06T 2207/10048; G06T 2207/20081;
(Continued)

(56) References Cited

U.S. PATENT DOCUMENTS

2015/0072400 A1 3/2015 Clarke
2020/0170226 A1* 6/2020 Aas ...................... G06T 7/0014
(Continued)

FOREIGN PATENT DOCUMENTS

CN 106719250 A 5/2017
CN 108801160 A 11/2018
(Continued)

*Primary Examiner* — Jennifer Mehmood
*Assistant Examiner* — Vaisali Rao Koppolu
(74) *Attorney, Agent, or Firm* — CKC & Partners Co., LLC (57) ABSTRACT

A method for estimating a length of underwater creatures and a system for estimating a length of underwater creatures are provided. The system includes a memory and a processor. The processor is electrically connected to the memory to load instructions in the memory to perform the method. The method includes: receiving a underwater image, in which the underwater image is captured by an image capturing device and includes a creature pattern of a target creature; performing an identification step on the creature pattern to obtain a creature lightness data set corresponding to the target creature; calculating a creature distance between the target creature and the image capturing device. In some embodiments, the identification step further obtains a creature structure data set of the target creature, and thus a creature length of the target creature is calculated in accordance with the creature distance and the creature structure data set.

13 Claims, 9 Drawing Sheets

(51) Int. Cl.
*G06T 7/50* (2017.01)
*G06V 20/05* (2022.01)
*G06V 40/10* (2022.01)

(52) U.S. Cl.
CPC .... *G06V 40/10* (2022.01); *G06T 2207/10016* (2013.01); *G06T 2207/10048* (2013.01); *G06T 2207/20081* (2013.01); *G06T 2207/20084* (2013.01)

(58) Field of Classification Search
CPC ... G06T 2207/20084; G06T 7/00; G06T 7/62; G01B 11/03; G01B 11/026; G01B 11/022; G01B 11/02; G06V 20/05; G06V 40/10; G06V 10/772; G06V 10/82; G06V 10/774; Y02A 40/81
See application file for complete search history.

(56) References Cited

U.S. PATENT DOCUMENTS

| | | | | |
|---|---|---|---|---|
| 2021/0045364 | A1* | 2/2021 | Huang | A01K 61/85 |
| 2021/0072017 | A1* | 3/2021 | Kitagawa | G01B 11/14 |
| 2021/0319562 | A1* | 10/2021 | Nie | G06T 7/13 |
| 2022/0071180 | A1* | 3/2022 | Chrobak | A01K 61/95 |
| 2022/0327721 | A1* | 10/2022 | Tomimori | G06T 7/62 |

FOREIGN PATENT DOCUMENTS

| | | |
|---|---|---|
| CN | 108917616 A | 11/2018 |
| CN | 111640152 A | 9/2020 |
| CN | 113450374 A | 9/2021 |
| CN | 114241031 A | 3/2022 |
| CN | 114758355 A | 7/2022 |
| TW | I266606 B | 11/2006 |
| TW | 202100944 A | 1/2021 |

\* cited by examiner

SYSTEM AND METHOD FOR ESTIMATING A LENGTH OF UNDERWATER CREATURES

RELATED APPLICATIONS

This application claims priority to Taiwan Application No. 111127457 filed on Jul. 22, 2022, which is herein incorporated by reference in its entirety.

BACKGROUND

Technical Field

The present disclosure relates to a method and a system for estimating a length of underwater creatures.

Description of Related Art

In the field of aquaculture, aquatic management operations, for example operations for determining growth states of the aquatic creatures, are required to benefit the cultivation of aquatic creatures. In general, conventional operations for determining the growth states of the aquatic creatures are performed manually. For example, operations for manually catching aquatic creatures randomly in the breeding pond and subsequently manually measuring the sizes of the aquatic creatures are performed to decide the growth states of the aquatic creatures in the breeding pond. However, the operations for manually catching the aquatic creatures and determining the growth states of the aquatic creatures are harmful to the aquatic creatures, and may even result death of the aquatic creatures.

Therefore, a method for estimating a length of underwater creatures and a system for estimating a length of underwater creatures are needed to solve the above problems.

SUMMARY

Embodiments of the present disclosure provide a method for estimating a length of underwater creatures and a system for estimating a length of underwater creatures capable of obtaining the length of the underwater creatures without catching the creatures in the breeding pond, thereby allowing users to understand the growth states of the creatures in the breeding pond.

In accordance with an embodiment of the present disclosure, the method for estimating the length of underwater creatures includes: receiving an underwater image captured by using an image capturing device, in which the underwater image includes a creature pattern of a target creature; performing an identification step on the creature pattern to obtain a creature lightness data set corresponding to the target creature; and calculating a creature distance between the target creature and the image capturing device according to the creature lightness data set.

In some embodiments, the step for performing identification on the creature pattern further obtains a creature structural data set of the target creature, and the method further includes: calculating a creature length of the target creature according to the creature distance and the creature structural data set.

In accordance with an embodiment of the present disclosure, the method for estimating the length of underwater creatures includes: performing a step for building a creature structural model; and performing a step for on-line measuring. The step for building the creature structural mode includes: providing a plurality of training images, in which each of the training images includes at least one training creature pattern and a plurality of training coordinate values corresponding to a plurality of creature feature points of the at least one training creature pattern; and training a computer model to obtain the creature structural model by using the training images and the training coordinate values, in which the computer model is a neural network model, a math model, or a statistical model. The step for on-line measuring includes: receiving a plurality of underwater images of a breeding pond in a predetermined time period, in which the underwater images are captured by using an image capturing device, and the underwater images include a plurality of creature patterns of a plurality of creatures; performing identification on the creature patterns of the underwater images to obtain a plurality of creature structural data sets and a plurality of creature lightness data sets corresponding to the creatures by using the creature structural model; determining a reference creature pattern from the creature patterns according to the creature structural data sets; calculating a creature distance between each of the creatures and the image capturing device according to the creature lightness data set of each of the creature patterns and the creature lightness data set of the reference creature pattern; and calculating a creature length of each of the creatures according to the creature distance between each of the creatures and the image capturing device and the creature structural data set of each of the creatures.

In some embodiments, the step for performing identification on the creature patterns of the underwater images by using the creature structural model includes: inputting each of the underwater images into the creature structural model to obtain a plurality of coordinate values of the creature feature points of each of the creature patterns.

In some embodiments, the step for calculating the creature distance between each of the creatures and the image capturing device according to the creature lightness data set of each of the creature patterns and the creature lightness data set of the reference creature pattern includes: calculating a lightness difference in the creature lightness data set of each of the creature patterns and the creature lightness data set of the reference creature pattern; and calculating the creature distance between each of the creatures and the image capturing device according to the lightness difference of each of the creature patterns and a reference distance of the breeding pond.

In some embodiments, the step for calculating the creature length of each of the creatures according to the creature distance between each of the creatures and the image capturing device and the creature structural data set of each of the creatures includes: determining at least one part length of each of the creature patterns according to the coordinate values of the creature feature points of each of the creature patterns; calculating a creature observation length of each of the creatures according to the at least one part length of each of the creature patterns; calculating a length adjustment magnification according to the creature distance between each of the creatures and the image capturing device; and calculating the creature length of each of the creatures according to the creature observation length and the length adjustment magnification of each of the creatures.

In some embodiments, the creatures are shrimps, and the creature feature points include eyes of the shrimps, heads of the shrimps, viscera of the shrimps, bodies of the shrimps and tails of the shrimps.

In some embodiments, the training images and the underwater images are infrared images, and the image capturing device is an infrared camera.

In some embodiments, the predetermined time period is a day, and the underwater images are obtained by sampling an underwater video, and a sampling frequency of sampling the underwater video is one piece every three seconds.

In some embodiments, the method further includes: calculating an average length of the creatures according to the creature lengths of the creatures; and storing the average length of the creatures in a database.

In some embodiments, the underwater images are captured by using one image capturing device only.

In accordance with an embodiment of the present disclosure, the system for estimating the length of underwater creatures includes: a memory configured to store a plurality of instructions; and a processor electrically connected to the memory to execute the instructions to: receive a plurality of underwater images of a breeding pond in a predetermined time period, in which the underwater images are captured by using an image capturing device, and the underwater images include a plurality of creature patterns of a plurality of creatures; perform identification on the creature patterns of the underwater images to obtain a plurality of creature structural data sets and a plurality of creature lightness data sets corresponding to the creatures by using a creature structural model; determine a reference creature pattern from the creature patterns according to the creature structural data sets; calculate a creature distance between each of the creatures and the image capturing device according to the creature lightness data set of each of the creature patterns and the creature lightness data set of the reference creature pattern; and calculate a creature length of each of the creatures according to the creature distance between each of the creatures and the image capturing device and the creature structural data set of each of the creatures.

In some embodiments, when the processor performs identification on the creature patterns of the underwater images by using the creature structural model, the processor is configured to input each of the underwater images into the creature structural model to obtain a plurality of coordinate values of a plurality of creature feature points of each of the creature patterns.

In some embodiments, when the processor calculates the creature distance between each of the creatures and the image capturing device according to the creature lightness data set of each of the creature patterns and the creature lightness data set of the reference creature pattern, the processor is configured to: calculate a lightness difference between the creature lightness data set of each of the creature patterns and the creature lightness data set of the reference creature pattern; and calculate the creature distance between each of the creatures and the image capturing device according to the lightness difference of each of the creature patterns and a reference distance of the breeding pond.

In some embodiments, when the processor calculates the creature length of each of the creatures according to the creature distance between each of the creatures and the image capturing device and the creature structural data set of each of the creatures, the processor is configured to: determine at least one part length of each of the creature patterns according to the coordinate values of the creature feature points of each of the creature patterns; calculate a creature observation length of each of the creatures according to the at least one part length of each of the creature patterns; calculate a length adjustment magnification according to the creature distance between each of the creatures and the image capturing device; and calculate the creature length of each of the creatures according to the creature observation length and the length adjustment magnification of each of the creatures.

In some embodiments, the creatures are shrimps, and the creature feature points include eyes of the shrimps, heads of the shrimps, viscera of the shrimps, bodies of the shrimps and tails of the shrimps.

In some embodiments, the underwater images are infrared images, and the image capturing device is an infrared camera.

In some embodiments, the predetermined time period is a day, and the underwater images are obtained by sampling an underwater video, and a sampling frequency of sampling the underwater video is one piece every three seconds.

In some embodiments, when the processor executes the instructions, the processor is further configured to: calculate an average length of the creatures according to the creature lengths of the creatures; and store the average length of the creatures in a database.

In some embodiments, the underwater images are captured by using one image capturing device only.

BRIEF DESCRIPTION OF THE DRAWINGS

In order to make the aforementioned features and advantages of the present disclosure been clear and more fully understood, the following specific examples are given and described in detail with the accompanying drawings as follows.

DETAILED DESCRIPTION

Embodiments hereinafter are described in detail accompanying with drawings. However, the embodiments provided in this context are not intended to limit the scope of the invention, and the descriptions of operations in this context are not intended to limit the order of performance. Any device with equivalent functions and produced from a structure formed by a recombination of elements shall fall within the scope of the invention. In addition, the drawings are only illustrative and are not drawn to actual size.

Figure 1:
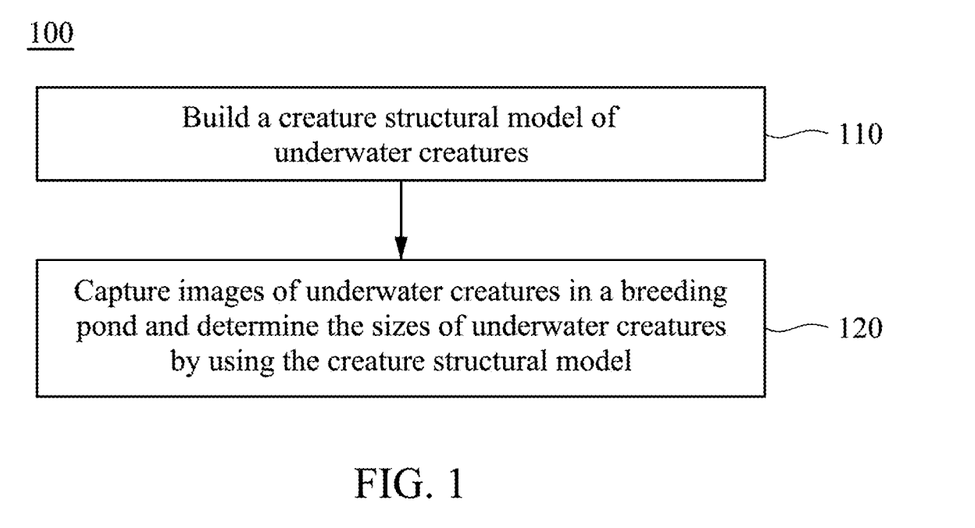
FIG. 1 illustrates a flow chart of a method for estimating a length of underwater creatures in accordance with some embodiments of the invention.

Referring to FIG. 1, FIG. 1 illustrates a flow chart of a method 100 for estimating a length of underwater creatures in accordance with some embodiments of the invention. In the method 100, at first, step 110 is performed to build a creature structural model of the underwater creatures. Step 110 is configured to train a computer model by using a plurality of training images of the underwater creatures to obtain the aforementioned creature structural model. In this embodiment, the underwater creatures are shrimps, such as white shrimps, but embodiments of the present invention are not limited thereto. Thereafter, step 120 is performed to perform on-line measuring by using the aforementioned creature structural model. In this embodiment, step 120 for performing on-line measuring is configured to capture images of the underwater creatures in a breeding pond and to determine the sizes of the underwater creatures by using the aforementioned creature structural model. In addition, the computer model may be a neural network model, a mathematical model, or a statistical model.

In order to overcome the shortcoming of requiring catching the underwater creatures to estimate the growth states in the conventional technology, the method 100 for estimating the length of underwater creatures builds the creature structural model of the underwater creatures, uses an underwater image capturing device in the breeding pond to capture the images of the underwater creatures in the breeding pond, and uses the aforementioned creature structural model to determine the growth states of the underwater creatures in the breeding pond. Therefore, the growth states of the underwater creatures (that are the sizes of the underwater creatures) can be obtained without catching the underwater creatures in the breeding pond. Steps 110 and 120 will be described in detail below.

Figure 2:
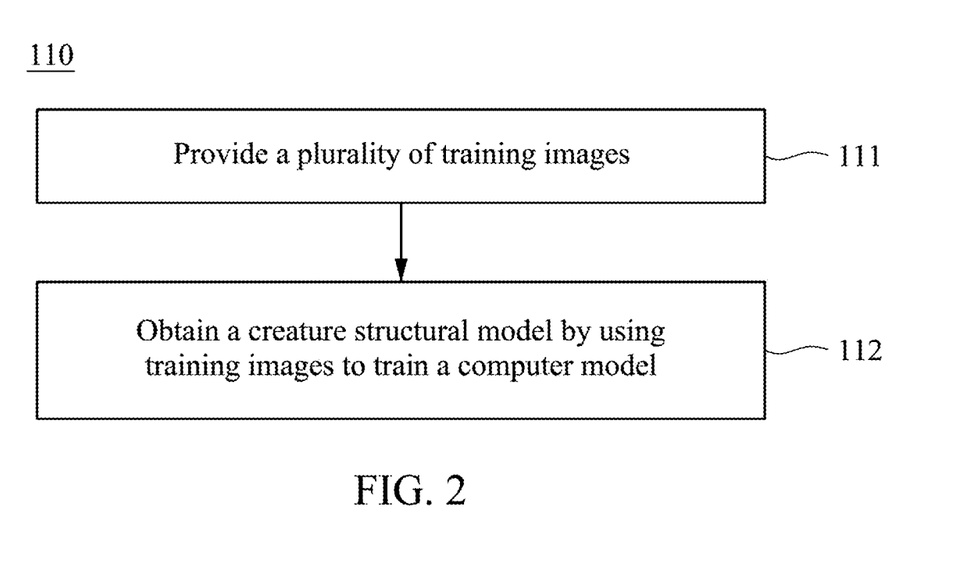
FIG. 2 illustrates a flow chart of a step for building the creature structural model in accordance with some embodiments of the invention.
Figure 3:
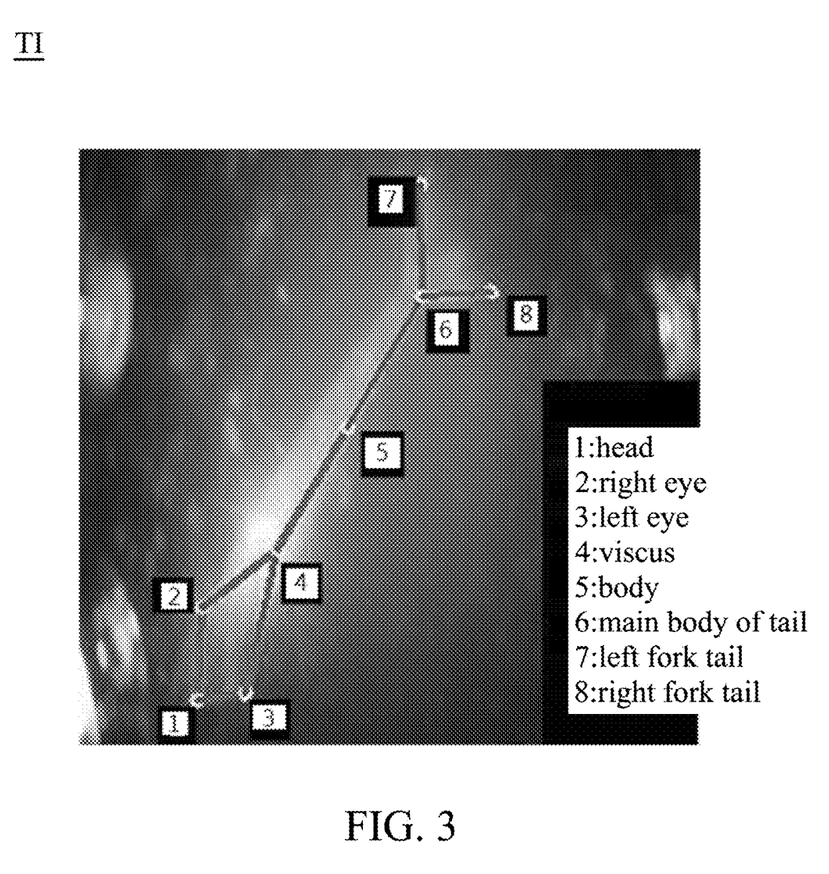
FIG. 3 illustrates a schematic diagram of a training image in accordance with some embodiments of the invention.

Referring to FIG. 2, FIG. 2 illustrates a flow chart of step 110 for building the creature structural model in accordance with some embodiments of the invention. In step 110, at first, step 111 is performed to provide a plurality of training images TI as shown in FIG. 3. In this embodiment, the training images TI are infrared images, but embodiments of the present invention are not limited thereto.

Each training image TI includes at least one training creature pattern and a plurality of training coordinate values of a plurality of creature feature points of each of the at least one training creature pattern. For example, the training creature pattern of FIG. 3 is a shrimp pattern, and the embodiment uses eight creature feature points represented by eight feature points 1-8, in which the feature point 1 is a head of the shrimp, the feature points 2-3 are a left eye and a right eye of the shrimp, the feature point 4 is a viscus of the shrimp, the feature point 5 is a body of the shrimp, and the feature points 6-8 are a tail of the shrimp, in which the feature point 6 is a main body of the tail and the feature points 7-8 are a left fork tail and a right fork tail. Therefore, each training image TI includes the eight creature feature points of the at least one shrimp and the coordinate values thereof (hereinafter, referred to as "training coordinate values").

In some embodiments, the number of the creature feature points may be increased or decreased. For example, only feature points 2-3 representing the eyes of the shrimp and the feature point 4 representing the viscus of the shrimp are used in some embodiments.

Figure 4A:
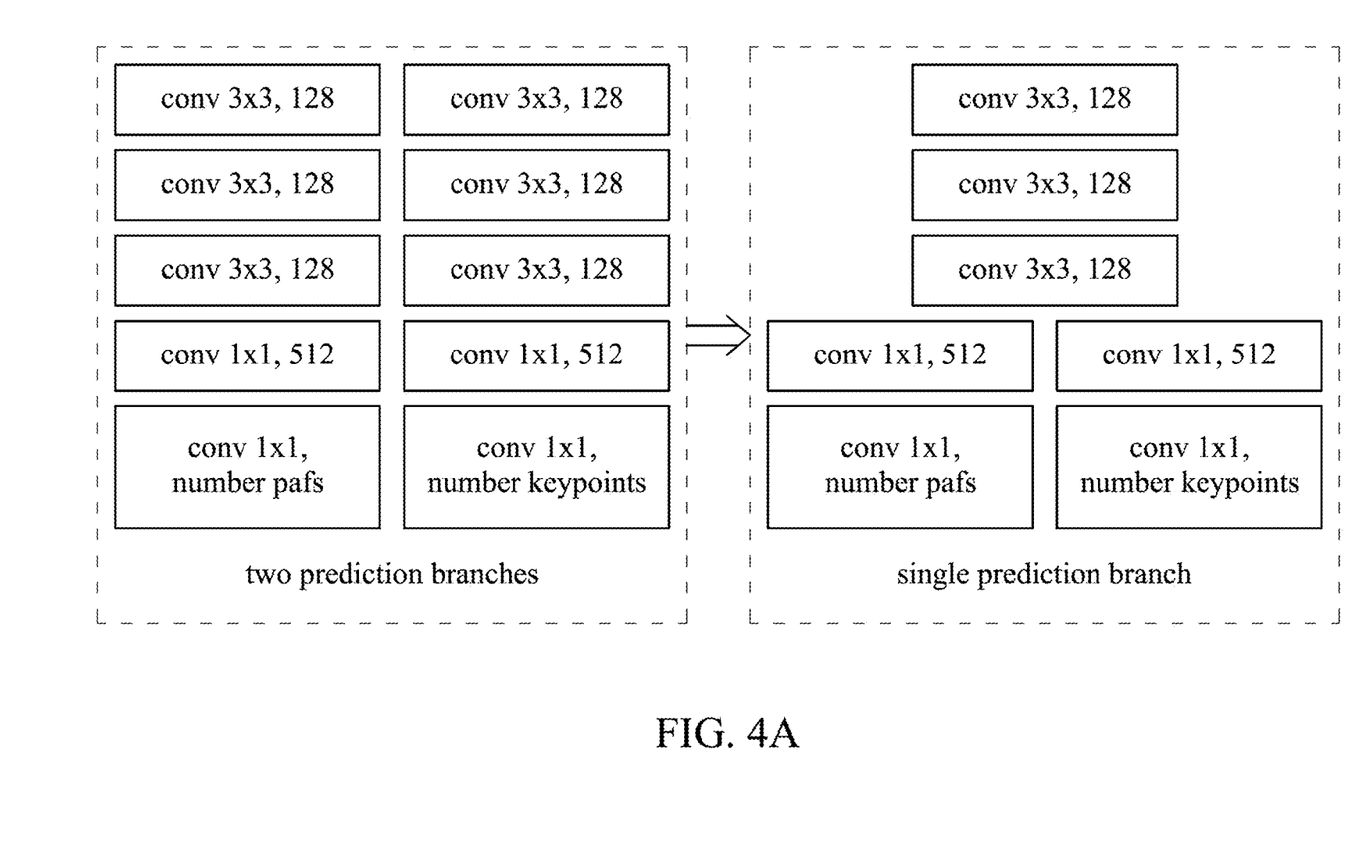
FIG. 4A illustrates a schematic diagram of incorporating prediction branches in accordance with some embodiments of the invention.
Figure 4B:
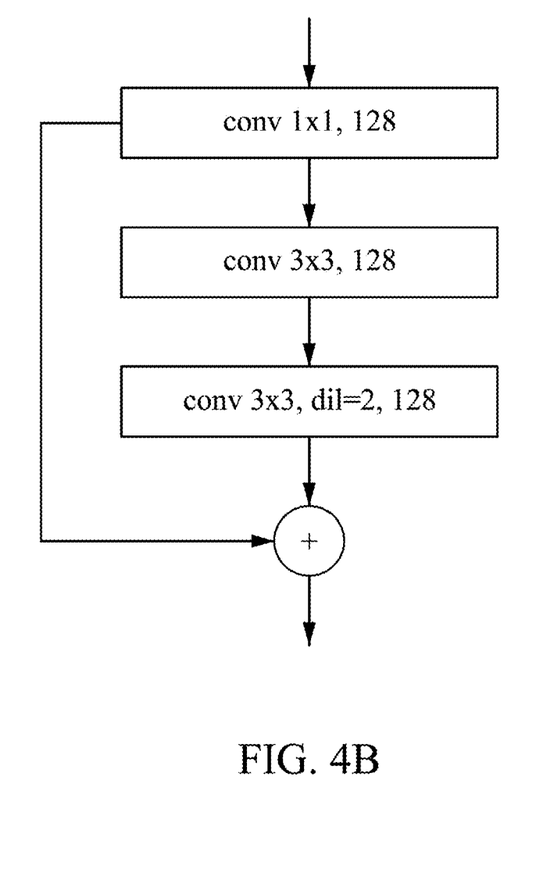
FIG. 4B illustrates a schematic diagram of convolution blocks in accordance with some embodiments of the invention.

After step 111, step 112 is subsequently performed to obtain the aforementioned creature structural model by using the aforementioned training images TI to train the computer model. In this embodiment, the computer model is the neural network model, such as an OpenPose model, but the embodiments of the present invention are not limited thereto. In some embodiments, in order to decrease the computation cost of an OpenPose algorithm corresponding to the OpenPose model, lightweight operations for the algorithm of the OpenPose algorithm, such as incorporating branches, and modifying refinement stages to convolution blocks are performed. For example, two prediction branches are incorporated into the single prediction branch because a main function for performing convolution in first few layers of OpenPose stages is to extract features, and image features focused by a part confidence map (PCM) and image features focused by a part affinity field (PAF) have relevance. Therefore, the first few layers of the OpenPose stages are incorporated and the last two layers of the OpenPose stages respectively generate the part confidence map and the part affinity field to accomplish the incorporating branches, as shown in FIG. 4A. In another example, a great number of 7×7 convolution layers used in refinement stages are modified into convolution blocks, as shown in FIG. 4B. Therefore, it may decrease the computation operations and maintain a vision of the 7'7 convolution layers at the same time.

In addition, considering the architecture of a Convolutional Neural Network (CNN) in the OpenPose model, in order to effectively fuse features of deep layers and features of shallow layers, in some embodiments, is applicable to use the architecture of a Feature Pyramid Network. Therefore, the features of the shallow layers by using smaller convolutions (that are the 1×1 convolution layers) are added to the features of the deep layers, and each feature tensor is inputted to a subsequent predictable network in an up-sampling processing. Therefore, high-level features of low-level and high semantic information and low-level features of high-level and low semantic information are performed to retain themselves, thereby enabling features in all sizes to have plentiful semantic information, and allowing the network to simultaneously have high precision detection results on big size objects, medium size objects and small size objects accordingly.

In some embodiments, an attention mechanism of YOLOv3 (You only look once version 3, YOLO version 3) is applicable to help object recognition and/or a self-attention generative adversarial network (SA-GAN), thereby finding out relevance between all similar features of the image features, and avoiding that only partial images are used by network training.

It is noted that because step 112 in some embodiments of the invention uses the plural creature feature points of the creature (e.g., shrimp) to build the creature structural model, step 112 can use an incomplete creature pattern to perform model training even if the creature pattern in the training image does not correspond to a complete creature (the incomplete creature pattern). Therefore, the creature structural model built by step 112 in some embodiments of the invention is capable of recognizing incomplete creature pattern in the image to obtain a length of a creature part (e.g., a shrimp part) in the image. In other words, the creature structural model in some embodiments of the invention can perform recognition for individual parts of the creature.

Figure 5:
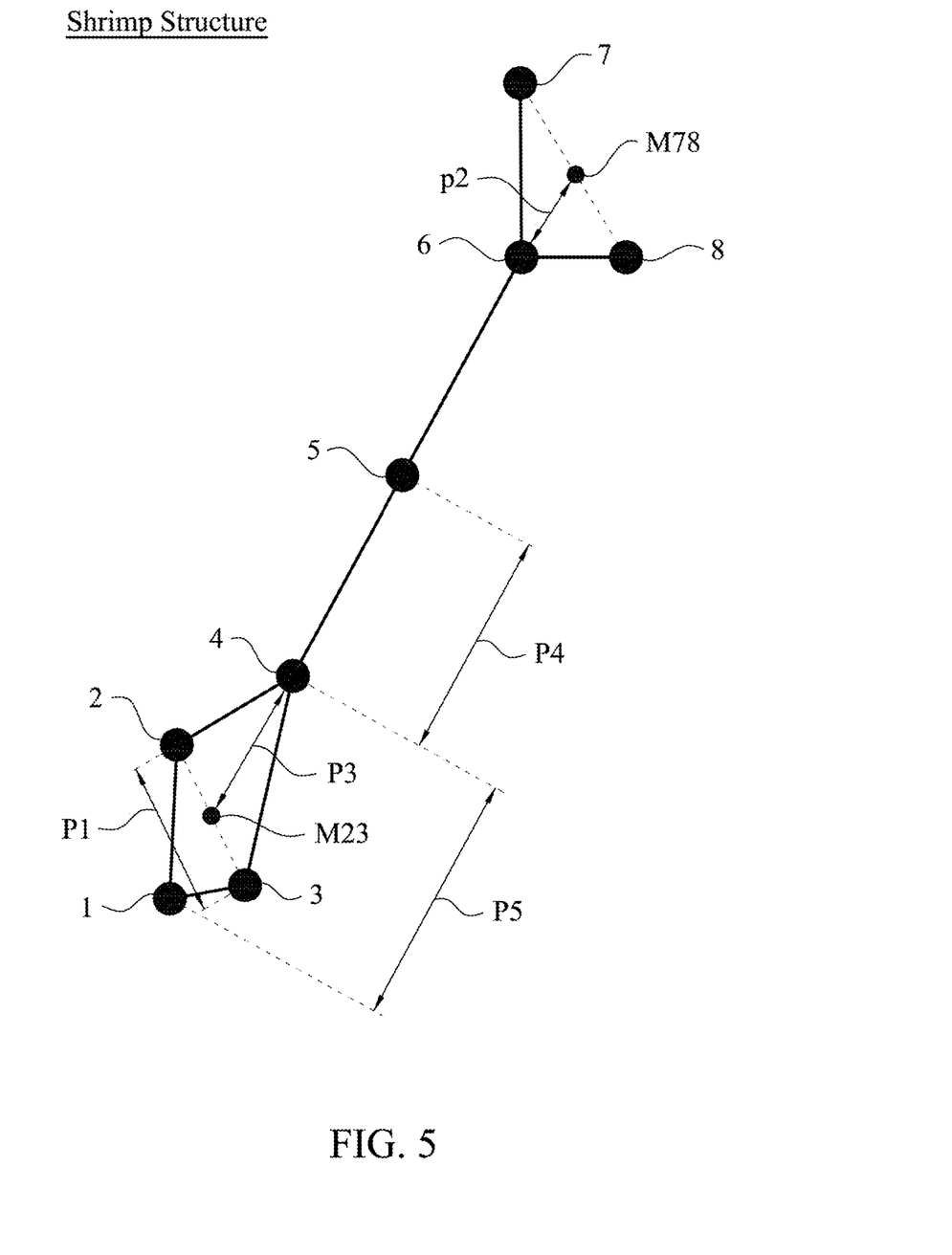
FIG. 5 illustrates a schematic diagram of feature points of a shrimp in accordance with some embodiments of the invention.

Specifically, in a case that only a head and a body of a shrimp are shown in an image, the creature structural model of some embodiments of the invention can also perform recognition according to a head feature point and a body feature point of the shrimp in the image to obtain a distance between the head and the body of the shrimp. In this embodiment, the shrimp parts include a part of a distance between eyes, a part of a tail, a part of the eyes to a viscus, a part of the viscus, and a part of a head, as shown in FIG. 5. FIG. 5 illustrates each shrimp part according to an embodiment of the invention, in which the shrimp in FIG. 5 is illustrated based on the shrimp structure formed from the feature points 1-8 of FIG. 3. As shown in FIG. 5, the part P1 of the distance between eyes is a distance between the feature point 2 and the feature point 3; the part P2 of the tail is a distance between a midpoint M78 of the feature point 7 and the feature point 8 and the feature point 6; the part P3 of the eyes to the viscus is a distance between a midpoint M23 of the feature point 2 and the feature point 3 and the feature point 4; the part P4 of the viscus is a distance between the feature point 4 and the feature point 5; the part P5 of the head is a distance between the feature point 1 and the feature point 4.

After building the creature structural model of the underwater creatures in step 112, aforementioned step 120 for performing on-line measuring is subsequently performed to capture the images of the underwater creatures in the breeding pond and determine the sizes of the underwater creatures by using the aforementioned creature structural model.

Figure 6:
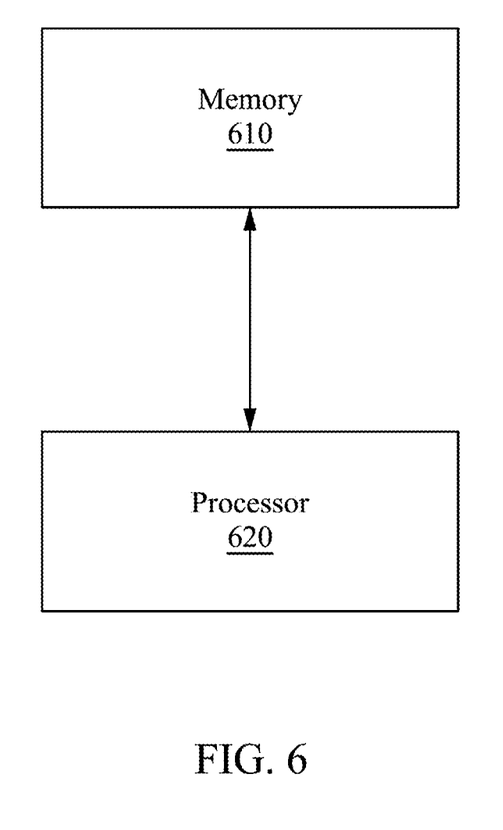
FIG. 6 illustrates a schematic diagram of a system for estimating the length of the underwater creatures in accordance with some embodiments of the invention.
Figure 7:
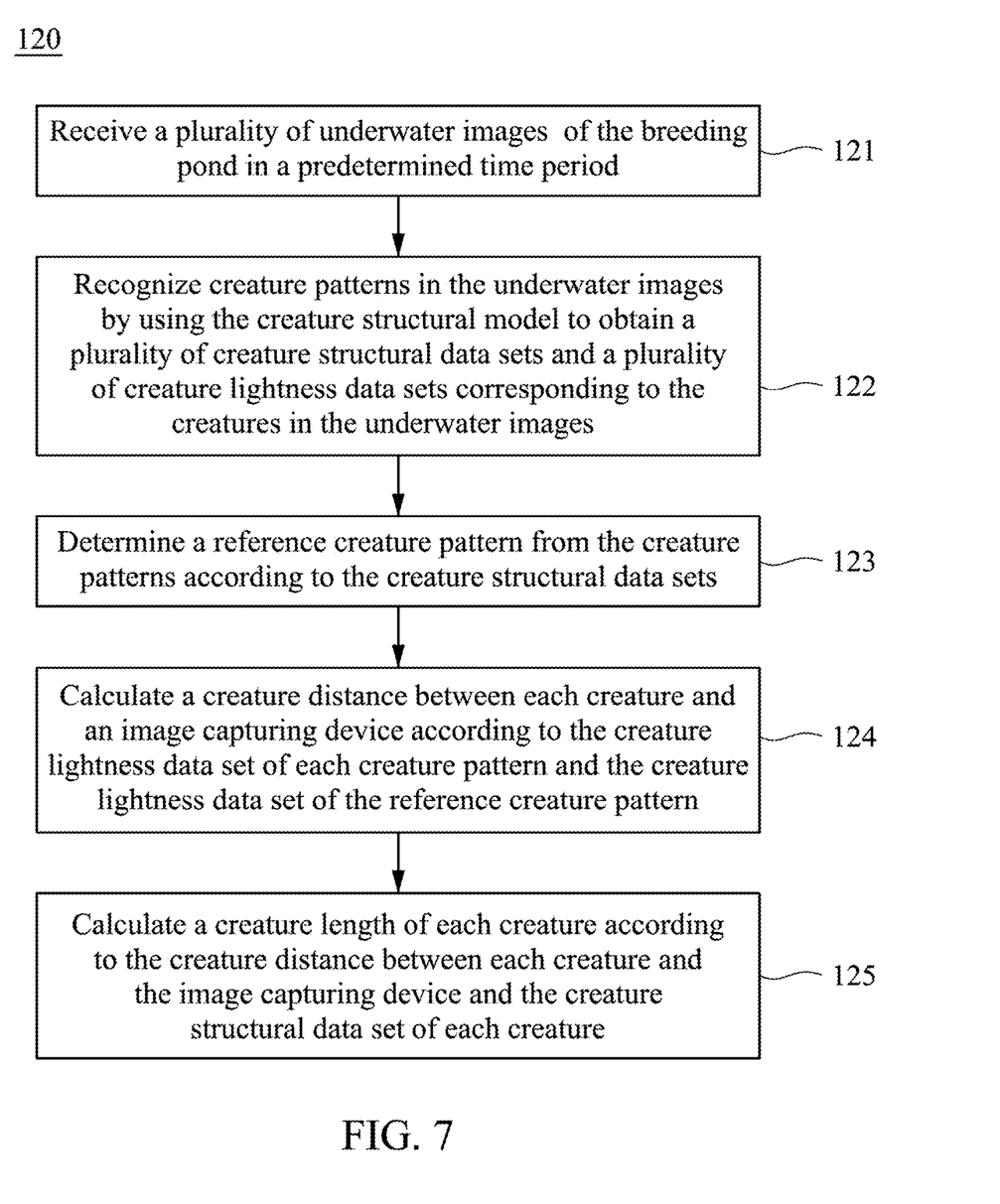
FIG. 7 illustrates a flow chart of a step for performing on-line measuring in accordance with some embodiments of the invention.

Referring to FIG. 6 and FIG. 7 at the same time, FIG. 6 illustrates a schematic diagram of a system 600 for estimating the length of the underwater creatures in accordance with some embodiments of the invention, and FIG. 7 illustrates a flow chart of step 120 for performing on-line measuring in accordance with some embodiments of the invention. The system 600 for estimating lengths of the underwater creatures includes a memory 610 and a processor 620. The memory 610 is configured to store a plurality of instructions, and the processor 620 is electrically connected to the memory 610 to load the instructions in the memory 610 and to perform step 120 for performing on-line measuring above. In some embodiments, the processor 620 may load the instructions in the memory 610 to perform step 110 for building the aforementioned creature structural model.

Figure 8:
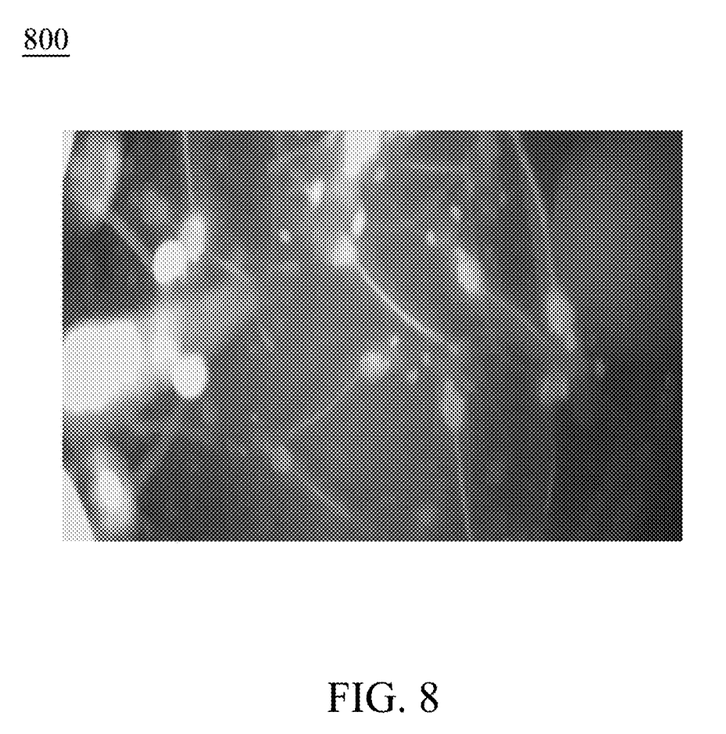
FIG. 8 illustrates a schematic diagram of an underwater image in accordance with some embodiments of the invention.

In step 120 for performing on-line measuring, step 121 is performed at first to receive a plurality of underwater images 800 of the breeding pond in a predetermined time period, as shown in FIG. 8. The underwater images are captured by using an image capturing device located in the breeding pond. In this embodiment, the aforementioned predetermined time period is 24 hours (that are images captured every day). The image capturing device is an infrared camera, and the aforementioned underwater images are provided by this one image capturing device only. In some embodiments, a plurality of image capturing devices may be disposed in the breeding pond to capture underwater images.

In order to observe the creatures in the breeding pond conveniently, in this embodiment, the image capturing device is set up above a feed pan to observe the creatures on the feed pan and to capture images of the creatures on the feed pan. Therefore, the background of each underwater image is the feed pan. In some embodiments, the image capturing device is configured to observe the creatures on a bottom net in the breeding pond and to capture the images of the creatures on the bottom net. In addition, a sampling frequency of the underwater images sampled by the image capturing device in this embodiment is one piece every 3 seconds, but embodiments of the present invention are not limited thereto.

Each underwater image includes a plurality of creature patterns of a plurality of creatures. In this embodiment, each underwater image includes a plurality of shrimp patterns corresponding to a plurality of shrimps. The data of each underwater image includes lightness values of pixels. In this embodiment, the lightness value is ranged from a minimum value 0 to a maximum value 255, but embodiments of the present invention are not limited thereto.

Then, step 122 is performed to recognize the creature patterns in the underwater images by using the aforementioned creature structural model to obtain a plurality of creature structural data sets and a plurality of creature lightness data sets corresponding to the creatures in the underwater images. As mentioned above, the creature structural model of embodiments of the present invention may recognize the creature structural data sets of the creatures corresponding to the creature patterns in the underwater images and obtain coordinate values of the creature feature points of the creature patterns. In some embodiments, results of recognition for the creature patterns in the underwater images by the aforementioned creature structural model include complete creature structures (e.g., whole shrimps) and/or parts of creature structures (e.g., the aforementioned shrimp parts).

Therefore, step 122 may obtain corresponding lightness data sets from the coordinate values of creature feature points corresponding to the underwater images according to the creature structural data sets. In this embodiment, the lightness data sets corresponding to the creatures include the lightness values of the creature feature points thereof. For example, in this embodiment, after a shrimp (or a shrimp part) in the underwater images is recognized, a corresponding creature structural data set thereof may include at least two of the aforementioned feature points 1-8, and a corresponding creature lightness data set thereof includes the lightness value of one of the aforementioned feature points 1-8. In this embodiment, the creature structural data set includes the feature point 4 (that is the viscus of the shrimp), but embodiments of the present invention are not limited thereto. In some embodiments, the creature structural data set may include the feature point 2 or the feature point 3 (that is the left eye or the right eye of the shrimp).

Then, step 123 is performed to determine a reference creature pattern from the creature patterns of the underwater images according to the aforementioned creature structural data sets. In some embodiments of the present invention, in order to compute a conversion ratio of pixels of the underwater image to an actual length of the creature, the reference creature pattern is required to be selected to be a reference creature for the conversion. The reference creature may be the creature farthest from a lens of the image capturing device. In some embodiments of the present invention, the reference creature (the reference creature pattern) is decided according to a lightness threshold. In this embodiment, the lightness threshold is 10%, thereby selecting the reference creature of the shrimp corresponding to a lightness value of last $10^{th}$ percent lightness in the aforementioned predetermined time period (that are 24 hours). For example, if the underwater images in 24 hours totally include 100 complete shrimp patterns, the shrimp patterns respectively correspond to 100 different lightness values, and the shrimp pattern having the lightness value 10 is the reference creature pattern (last 10th percent lightness). In some embodiments, the lightness threshold may be modified according to requirements. For example, the lightness threshold is modified to 15%.

In addition, in the underwater images, the creature patterns of which the lightness values are lower than the lightness threshold are omitted and can't be the creatures for estimating lengths.

Thereafter, step 124 is performed to compute a creature distance between each creature and the image capturing device according to the creature lightness data set of each creature pattern and the creature lightness data set of the reference creature pattern. In this embodiment, the calculation equation of the creature distance d is as follows:

$$d = D - (R*C) \quad (1)$$

where D (reference distance) is a distance between the lens of the image capturing device and the feed pan; R is a ratio of a lightness difference to a background lightness and the lightness difference is between the creature lightness data set (lightness value) of the creature pattern of a target creature of currently processing and the creature lightness data set (lightness value) of the reference creature pattern; C is an environmental application factor. In this embodiment, the value of the environmental application factor C is 5.

In this embodiment, the lightness difference between the creature lightness data set of the creature pattern of the target creature and the creature lightness data set of the reference creature pattern may be calculated at first, and then the lightness difference divided by the lightness value of the feed pan is to obtain the ratio R. In some embodiments, a ratio of the creature lightness data set of the creature pattern of the target creature to the lightness value of the feed pan and a ratio of the creature lightness data set of the reference creature pattern to the lightness value of the feed pan are firstly calculated, respectively, and then, a difference between two ratios is calculated to obtain the ratio R.

Then, step 125 is performed to calculate a creature length of each creature according to the creature distance between each creature and the image capturing device and the creature structural data set of each creature. In step 125, at first, a part length of each creature pattern is determined according to the coordinate values of the creature feature points of each creature pattern. Thereafter, a creature observation length of each creature is calculated according to the part length of each creature pattern, in which the creature observation length is a length of each creature pattern in the underwater images and units are pixels thereof. In aforementioned step 122, if the recognized creature structural data set corresponds to an incomplete creature pattern (e.g., a creature pattern of only a shrimp part), the length of the part of the shrimp (part length) multiplied by a corresponding part proportion is to calculate the creature observation length in step 125. On the contrary, if the recognized creature structural data set corresponds to a complete creature pattern (e.g., a complete shrimp pattern), the length of a part (part length) selected from a plurality of parts of the creature in the complete creature pattern multiplied by a corresponding part proportion is to calculate the creature observation length in step 125.

In this embodiment, the corresponding part proportion of the part of the eyes to the viscus is 3.95; the corresponding part proportion of the part of the distance between eyes is 8.42; the corresponding part proportion of the part of the tail is 6.61; the corresponding part proportion of the part of the viscus is 5.17; the corresponding part proportion of the part of the head is 2.49.

Thereafter, a length adjustment magnification is calculated according to the creature distance between each creature and the image capturing device. In some embodiments of the present invention, because the distance between each creature and the image capturing device may affect the length of each creature pattern of each creature in the image, the length adjustment magnification is provided to perform adjustment for the corresponding length in some embodiments of the present invention. In aforementioned step 124, the creature distance d between each creature and the image capturing device has been calculated, and the creature distance d of each creature divided by the distance D between the lens of the image capturing device and the feed pan is to obtain the length adjustment magnification T in step 125.

Figure 9:
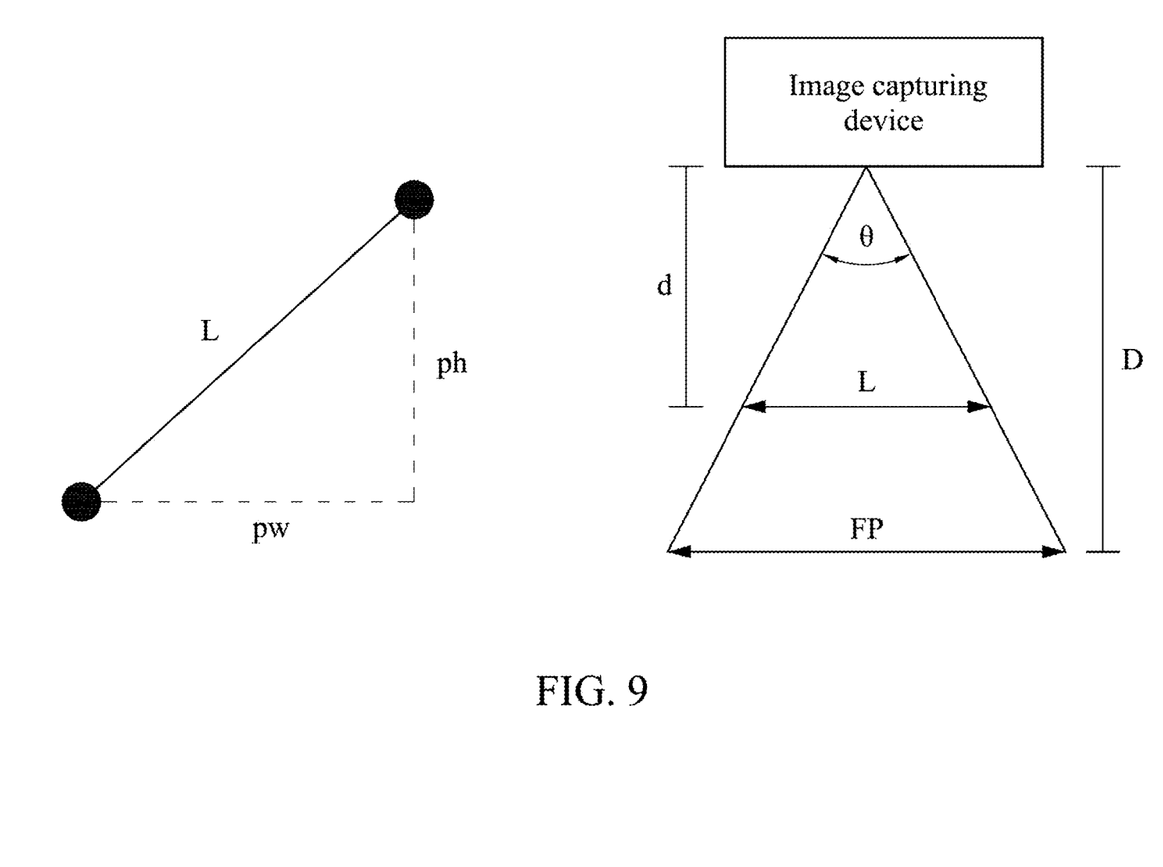
FIG. 9 illustrates a schematic diagram of converting an actual creature length.

Then, the actual creature length of each creature is calculated according to the creature observation length and the length adjustment magnification of each creature. In some embodiments of the present invention, as shown in FIG. 9, a shooting wide angle θ of the image capturing device and the distance D between the image capturing device and the feed pan may be firstly measured to calculate calculation units (e.g., unit: centimeter) which are corresponding to each pixel height and each pixel width under a condition that the images are captured by the image capturing device in the distance D. Further, L is the actual length (e.g., unit: centimeter) of the part creature, and FP is the actual length (e.g., unit: centimeter) of the feed pan. Therefore, the creature observation lengths corresponding to the lengths of the creature parts (e.g., the aforementioned shrimp parts) in the underwater images are converted to the corresponding lengths with the calculation units (e.g., unit: centimeter) in the distance D, and the lengths represented by the calculation units can be used to calculate the actual lengths of the parts of the creatures with the aforementioned creature distance d. Considering the actual length and the length represented by the calculation units of the creature part, the principle of similar triangles can be used to convert objects at different distances in the condition that the creature part is located in the distance D. The conversion equation is as follows:

$$L = \sqrt{(Pw*T)^2 + (Ph*T)^2} \quad (2)$$

where Pw is a width (e.g., unit: centimeter) corresponding to the length with pixel widths (e.g., unit: pixel) of the creature part in the distance D; where Ph is a height (e.g., unit: centimeter) corresponding to the length with pixel heights (e.g., unit: pixel) of the creature part in the distance D. In this embodiment, Pw and Ph are lengths with the calculation units.

In some embodiments, if the recognized creature structural data set corresponds to the complete creature pattern (e.g., the complete shrimp pattern), the creature length may be calculated by no using the part proportion in step 125. For example, each actual length of each part of the creature may be calculated by using equation (1) and equation (2) above, and then the actual lengths of parts of the creature are added to obtain a total length. In some embodiments, the distance such as the feature point 1 (the head of the shrimp) to the midpoint M78 (as shown in FIG. 5) may be calculated to obtain the actual length of the shrimp.

In some embodiments, a value of an average length of the creatures is calculated according to the creature lengths of the creatures in all of the underwater images, and the value of the average length is stored in a database. Therefore, the users can know the creature lengths of the creatures in the breeding pond every day, thereby determining the growth states of the creatures in the breeding pond.

As mentioned above, the method 100 for estimating the length of underwater creatures and the system 600 for estimating the length of underwater creatures in some embodiments of the present invention are configured to use the image capturing device in the breeding pond to capture the images of the creatures in the breeding pond, and to perform to analyze for the images to calculate the creature lengths. Therefore, it is capable for determining the growth states of the creatures in the breeding pond without catching the creatures in the breeding pond. Furthermore, the method 100 for estimating the length of underwater creatures and the system 600 for estimating the length of underwater creatures in some embodiments of the present invention also consider a change of water quality in the breeding pond. Therefore, even if the breeding pond is cloudy water, the method 100 for estimating the length of underwater creatures and the system 600 for estimating the length of underwater creatures in some embodiments of the present invention are applicable to perform to estimate and calculate the lengths of underwater creatures.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for estimating a length of underwater creatures, comprising:
performing a step for building a creature structural model, comprising:
providing a plurality of training images, wherein each of the training images comprises at least one training creature pattern and a plurality of training coordinate values corresponding to a plurality of creature feature points of the at least one training creature pattern; and
training a computer model to obtain the creature structural model by using the training images and the training coordinate values, wherein the computer model is a neural network model, a math model, or a statistical model; and
performing a step for on-line measuring, comprising:
receiving a plurality of underwater images of a breeding pond in a predetermined time period, wherein the underwater images are captured by using an image capturing device, and the underwater images comprise a plurality of creature patterns of a plurality of creatures;
performing identification on the creature patterns of the underwater images to obtain a plurality of creature structural data sets and a plurality of creature lightness data sets corresponding to the creatures by using the creature structural model;
determining a reference creature pattern from the creature patterns according to the creature structural data sets;
calculating a creature distance between each of the creatures and the image capturing device according to the creature lightness data set of each of the creature patterns and the creature lightness data set of the reference creature pattern; and
calculating a creature length of each of the creatures according to the creature distance between each of the creatures and the image capturing device and the creature structural data set of each of the creatures;
wherein the step for performing identification on the creature patterns of the underwater images by using the creature structural model comprises:
inputting each of the underwater images into the creature structural model to obtain a plurality of coordinate values of the creature feature points of each of the creature patterns;
wherein the step for calculating the creature distance between each of the creatures and the image capturing device according to the creature lightness data set of each of the creature patterns and the creature lightness data set of the reference creature pattern comprises:
calculating a lightness difference between the creature lightness data set of each of the creature patterns and the creature lightness data set of the reference creature pattern; and
calculating the creature distance between each of the creatures and the image capturing device according to the lightness difference of each of the creature patterns and a reference distance of the breeding pond.

2. The method of claim 1, wherein the step for calculating the creature length of each of the creatures according to the creature distance between each of the creatures and the image capturing device and the creature structural data set of each of the creatures comprises:
determining at least one part length of each of the creature patterns according to the coordinate values of the creature feature points of each of the creature patterns;
calculating a creature observation length of each of the creatures according to the at least one part length of each of the creature patterns;
calculating a length adjustment magnification according to the creature distance between each of the creatures and the image capturing device; and
calculating the creature length of each of the creatures according to the creature observation length and the length adjustment magnification of each of the creatures.

3. The method of claim 1, wherein the creatures are shrimps, and the creature feature points comprise eyes of the shrimps, heads of the shrimps, viscera of the shrimps, bodies of the shrimps and tails of the shrimps.

4. The method of claim 1, wherein the training images and the underwater images are infrared images, and the image capturing device is an infrared camera.

5. The method of claim 1, wherein the predetermined time period is a day, and the underwater images are obtained by sampling an underwater video, and a sampling frequency of sampling the underwater video is one piece every three seconds.

6. The method of claim 1, further comprising:
calculating an average length of the creatures according to the creature lengths of the creatures; and
storing the average length of the creatures in a database.

7. The method of claim 1, wherein the underwater images are captured by using one image capturing device only.

8. A system for estimating a length of underwater creatures, comprising:
a memory configured to store a plurality of instructions; and
a processor electrically connected to the memory to execute the instructions to:
receive a plurality of underwater images of a breeding pond in a predetermined time period, wherein the underwater images are captured by using an image capturing device, and the underwater images comprise a plurality of creature patterns of a plurality of creatures;
perform identification on the creature patterns of the underwater images to obtain a plurality of creature structural data sets and a plurality of creature lightness data sets corresponding to the creatures by using a creature structural model;

determine a reference creature pattern from the creature patterns according to the creature structural data sets;

calculate a creature distance between each of the creatures and the image capturing device according to the creature lightness data set of each of the creature patterns and the creature lightness data set of the reference creature pattern; and calculate a creature length of each of the creatures according to the creature distance between each of the creatures and the image capturing device and the creature structural data set of each of the creatures;

wherein when the processor performs identification on the creature patterns of the underwater images by using the creature structural model, the processor is configured to:

input each of the underwater images into the creature structural model to obtain a plurality of coordinate values of a plurality of creature feature points of each of the creature patterns;

wherein when the processor calculates the creature distance between each of the creatures and the image capturing device according to the creature lightness data set of each of the creature patterns and the creature lightness data set of the reference creature pattern, the processor is configured to:

calculate a lightness difference between the creature lightness data set of each of the creature patterns and the creature lightness data set of the reference creature pattern; and     calculate the creature distance between each of the creatures and the image capturing device according to the lightness difference of each of the creature patterns and a reference distance of the breeding pond;

wherein the predetermined time period is a day, and the underwater images are obtained by sampling an underwater video, and a sampling frequency of sampling the underwater video is one piece every three seconds.

9. The system of claim 8, wherein when the processor calculates the creature length of each of the creatures according to the creature distance between each of the creatures and the image capturing device and the creature structural data set of each of the creatures, the processor is configured to:

determine at least one part length of each of the creature patterns according to the coordinate values of the creature feature points of each of the creature patterns;

calculate a creature observation length of each of the creatures according to the at least one part length of each of the creature patterns;

calculate a length adjustment magnification according to the creature distance between each of the creatures and the image capturing device; and     calculate the creature length of each of the creatures according to the creature observation length and the length adjustment magnification of each of the creatures.

10. The system of claim 8, wherein the creatures are shrimps, and the creature feature points comprise eyes of the shrimps, heads of the shrimps, viscera of the shrimps, bodies of the shrimps and tails of the shrimps.

11. The system of claim 8, wherein the underwater images are infrared images, and the image capturing device is an infrared camera.

12. The system of claim 8, wherein when the processor executes the instructions, the processor is further configured to:

calculate an average length of the creatures according to the creature lengths of the creatures; and     store the average length of the creatures in a database.

13. The system of claim 8, wherein the underwater images are captured by using one image capturing device only.

* * * * *